3,772,396
PROCESS FOR DEPOLYMERIZING DICYCLOPENTADIENE

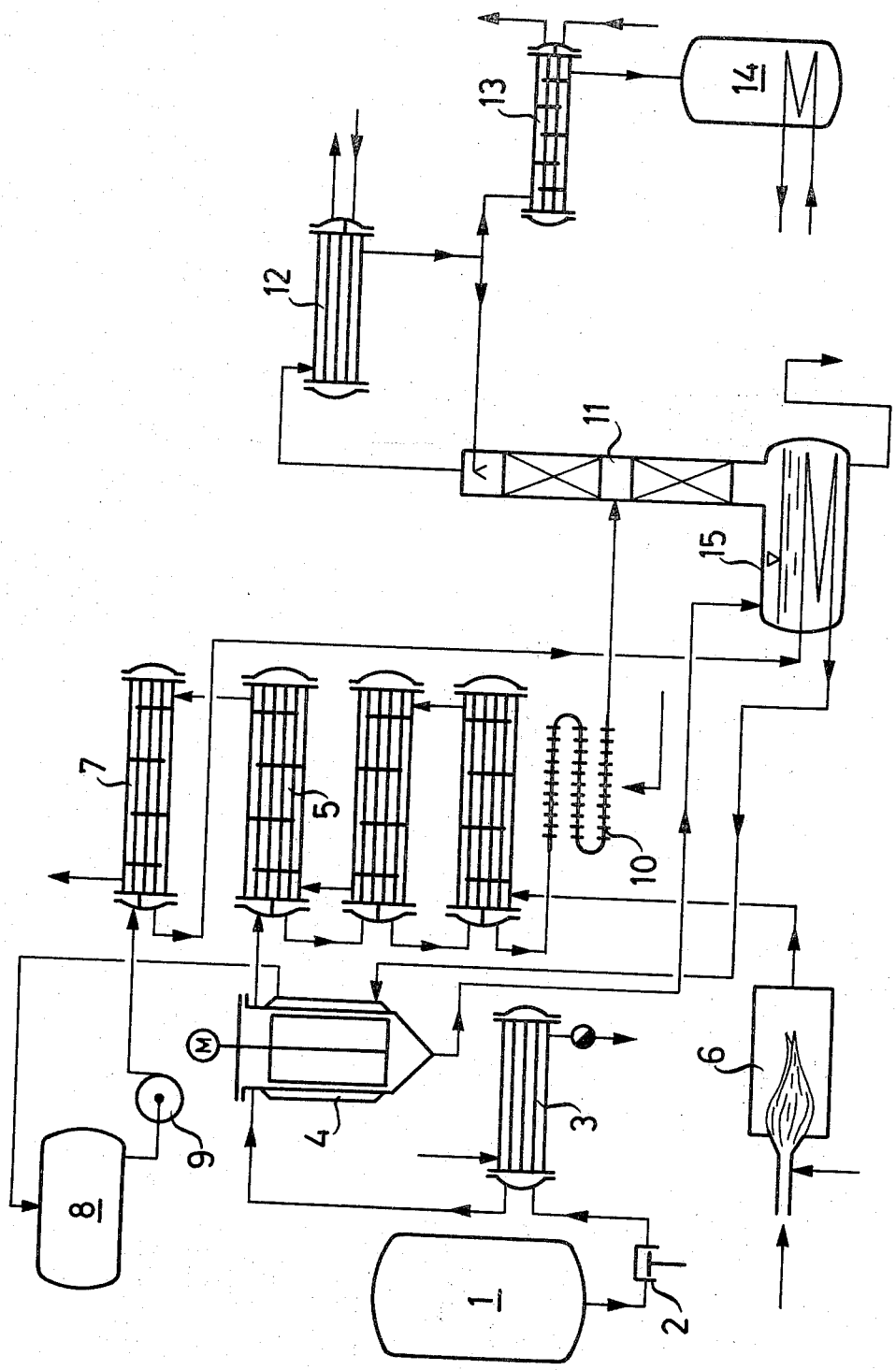

Heinz Boesenberg, Hofheim, Taunus, Heinz Frensch, Frankfurt am Main, and Harald Lorenz, Fischbach, Taunus, Germany, assignors to Farbwerke Hoechst Aktiengesellschaft vormals Meister Lucius & Bruning, Frankfurt am Main, Germany
Filed Jan. 17, 1972, Ser. No. 218,230
Claims priority, application Germany, Jan. 19, 1971,
P 21 02 262.8
Int. Cl. C07c 3/26
U.S. Cl. 260—666 A       1 Claim

ABSTRACT OF THE DISCLOSURE

Dicyclopentadiene is thermally split to yield cyclopentadiene by first evaporating dicyclopentadiene in a film evaporator, carrying the vapor to a tube-type heat exchanger, cracking the vapor and rectifying the cyclopentadiene. Cracking is carried out at 270–400° C., the vapor being passed through the heat exchanger at a velocity such to yield a residence time of 6–12 seconds in a turbulent flow. Cyclopentadiene of about 99.9% purity is obtained, and the conversion rate is over 90%.

---

The present invention relates to a process for depolymerizing dicyclopentadiene by thermal splitting.

Cyclopentadiene which is an important intermediate for the synthesis of pesticides and dyestuffs, is obtained by the thermal splitting of its dimer.

It has already been proposed to split dicyclopentadiene by heating in an auxiliary liquid. According to British Pats. Nos. 612,893 and 769,813 hydrocarbon fractions boiling at 190–250° C. or 250–350° C. are employed for this purpose. The latter process gives especially high yields of 90–96%, however, the concentration of the dicyclopentadiene in the auxiliary liquid not being allowed to exceed 5% by weight, the space-time yields are too low to meet industrial requirements.

An auxiliary low-boiling solvent is used in a process described in U.S. Pat. No. 3,016,410, according to which dicyclopentadiene is dissolved in an amount of up to 30% by weight in a solvent the boiling point of which is higher than that of cyclopentadiene and lower than that of dicyclopentadiene. The solution is heated to the boiling point at most; depolymerization of dicyclopentadiene is carried out on heated surfaces which are immersed in the solution. that of the solution. In this process the conversion rates are high but, due to the restricted concentration, the space-time yield is low.

In a process according to U.S. Pat. No. 2,913,504, no auxiliary solvent is used, it being proposed to evaporate dicyclopentadiene, to divide the vapor flow into at least two separate flows and to convey these into a depolymerization reactor operated at temperatures of from 260–300° C. Thereby, practically no polymerization and decomposition products will form, so that the installation can be run for a long time, e.g. for 500 hours without interruption. However, only moderate yields of monomeric diene, 70% at most, calculated on the dimer, are obtained.

Therefore, according to British Pat. No. 1,018,046, the cracking in the gaseous phase has been modified in such a way that dicyclopentadiene is evaporated and split in a copper packed column with internal heating, whereupon it is taken over by a high-boiling auxiliary liquid and then conveyed ot the distillation step. In spite of good yields, the process cannot easily be realized since the heating of a large scale cracking column where an electrical heating is out of the question for economical reasons, can be mounted, and above all, regulated with difficulty only.

Moreover, the fractionating part of the installation has to be operated with an auxiliary liquid thereby diminishing the space-time yield.

It has now been found that cyclopentadiene of high purity is obtained with good space-time yields by evaporating dicyclopentadiene in a film evaporator, splitting the vapor in a turbulent flow with a residence time of 6–12 seconds at 270–400° C. in a tube heat exchanger, cooling the splitting product obtained to 150–200° C. and rectifying it. The portion of the starting material which does not evaporate in the film evaporator, is advantageously conducted to a still at the sump of the rectifying column where it is split during a residence time of 500–1000 hours.

It is likewise possible to reconduct to the film evaporator that portion which has not evaporated, a partial flow being always withdrawn and destroyed. Thus, the accumulation of tricyclopentadiene in the still is prevented which, during the prolonged residence time, would polymerize to yield tetra- and pentacyclopentadiene.

The process is now illustrated in more detail with reference to the accompanying drawing.

From storage tank 1 crude cyclopentadiene with a content of 90–98% by weight of dicyclopentadiene is pumped by means of a piston dosing pump 2 into steam-heated tube heater 3 and from there is conveyed to film evaporator 4 of a conventional make. There, evaporation under mild conditions and a partial cracking of the dicyclopentadiene are carried out. The film evaporator is heated by a heating liquid, the temperature of which is adjusted to 200–240° C. according to the nature of the dicyclopentadiene. At the bottom of the film evaporator a sump of 3–5% of the dicyclopentadiene used is discharged and conveyed to still 15 of rectifying column 11. Alternatively, the discharge may be reconducted into the film evaporator, a part thereof being removed. The vaporous dicyclopentadiene with about 5–10% by weight of cyclopentadiene of 180° C. leaving film evaporator 4 is now entering flue-gas heated cracking reactor 5 where more than 99% of the vapor is split to cyclopentadiene. The cracking reactor consists of several tube heat exchangers disposed one behind the other. The vapor mixture to be split is passed on through the interiors of the tubes and heated to 270–400° C., preferably to 290–320° C.

On the outer side, flue-gas is conducted in countercurrent having an input temperature of from 390–520° C. and an outlet temperature of from 300–400° C. The flue-gas is produced in combustion chamber 6 by combustion of fuel gas, technical residual gases, oil or liquid residues or mixtures thereof. The flue-gas flowing off cracking reactor 5 is passing a heat exchanger 7 where a heating liquid is heated serving for heating still 15 and film evaporator 4. From storage tank 9 the heating liquid is conveyed by means of rotary pump 10 into heat exchanger 8 and from there into still 15, into film evaporator 4 and back again into storage tank 9. The heating liquid cycle is adjusted in a manner such that in the film evaporator 4 it is not cooled by more than 10° C. The crude cyclopentadiene with a dicyclopentadiene content of less than 1% by weight leaving cracking reactor 5 is cooled to 150–200° C. in air-cooled finned tube cooler 10, then conveyed to rectifying column 11 which consists of a reinforcing and a stripping section. The pure cyclopentadiene is withdrawn on top of the column in vapor form and condensed in water-cooled condenser 12. A portion of the liquid cyclopentadiene (purity above 99.9% by weight) flowing off the condenser is returned to column 11 as reflux, whereas the main portion thereof is cooled to −10 to −20° C. in brine-cooled heat exchanger 13 and introduced into brine-cooled tank 14, from where the cyclopentadiene can be supplied to the consumers. Beneath the sump of column 11, a liquid-heated still 15 is arranged. There accumulate the bi-products contained in the crude dicyclopentadiene which have a higher boiling point than cyclopentadiene. These by-products are mixtures consisting of aliphatic hydrocarbons and impurities not determined by gas-chromatography. The reflux ratio is so controlled that a cyclopentadiene having a purity of 99.9% by weight is removed on top while the high-boiling impurities (boiling point of from 180-240° C.) accumulate in the still.

The cyclopentadiene from the reflux evaporates in the still which is so dimensioned that the impurities have an average residence time of 500-1000 hours.

Due to the prolonged residence time, the dicyclopentadiene from the discharge of the film evaporator is split in the still to cyclopentadiene. A small portion only is polymerized to yield higher cyclopentadienes. The by-products are removed from the still by means of a syphon and then destroyed.

The diameter and the length of the tubes in cracking reactor 5 are chosen in such a way that due to the velocity of the gas a residence time of 6-12 seconds is attained and the Reynold's number is 70,000-100,000 at the inlet of the cracking reactor and 20,000-50,000 at the outlet, the loss of pressure not exceeding 0.2 atmosphere gauge. The strong turbulence owing to the high Reynold's numbers, ensures a good heat transfer and substantially avoids the formation of soot.

The following example illustrates the invention.

EXAMPLE 114 kg./h. of dicyclopentadiene of the following specification.

| | Percent by weight |
|---|---|
| Aliphatic hydrocarbons | 1.00 |
| Cyclopentadiene | 0.25 |
| Benzene | 0.01 |
| Unknown components | 1.07 |
| Dicyclopentadiene | 97.67 |
| | 100.00 | are pumped from a storage tank by means of a piston dosing pump into a steam-heated tube heater having a heating surface of 1 m.$^2$, heated to about 160° C. and conveyed to a film evaporator having a heating surface of 2 m.$^2$ where the dicyclopentadiene is evaporated and partially split.

The input temperature of the heating liquid into the film evaporator is 230° C. and the outlet-temperature is 220° C. The evaporated dicyclopentadiene with a cyclopentadiene content of about 5% by weight is now transported to the flue-gas heated cracking-reactor and is heated from 180° C. to 400° C. The cracking-reactor consists of three series-connected heat exchangers of 5 m. length equipped each with 6 tubes of a nominal width of 50 mm. The deflection chambers of the heat exchanger are equipped with radially disposed baffle plates, so that each tube is subsequently passed by the cracked gas. At the inlet, the velocity of the cracked gas is 4.4 m./s. and at the outlet it is 14 m./s., the loss of pressure amounting to 0.1 atmosphere gauge.

The flue gases which enter the cracking-reactor at a temperature of 520° C. are deflected by means of baffle plates in order to intensify heat transfer and are emerging from the reactor at a temperature of 400° C. Thereupon, the flue gas flows through the heat exchanger and thus heats the heating liquid used for heating the film evaporator. The cyclopentadiene leaving the cracking reactor is cooled in an air-cooler to about 200° C. and conveyed to a rectifying column having a diameter of 250 mm. and filled with Intalox® tower packing ¾″. The reinforcing and stripping sections of the column have each a packing the height of which is 2 m. The vaporous cyclopentadiene withdrawn at the top is condensed in the water-cooled condenser having a cooling surface of 3 m.$^2$. One portion of the liquid cyclopentadiene is introduced into the column as reflux, the main portion being cooled to —10° C. in the brine-cooled cooler having a cooling surface of 1 m.$^2$ and then conducted to the brine-cooled reservoir.

Beneath the rectifying column a still of 3 m.$^3$ capacity is placed equipped with a heating coil having a heating surface of 2 m.$^2$, through which a heating liquid is flowing, at an inlet temperature of 232° C. and an outlet temperature of 230° C. The cyclopentadiene from the reflux of the column evaporates immediately on the surface of the liquid in the still and flows back to the column in vapor form. The discharge from the film evaporator which is emerging at a rate of approximately 5-6 l./h. and which consists of 60-70% of dicyclopentadiene is conveyed to the still.

Owing to the high dilution and a residence time of about 1000 hours, the dicyclopentadiene is split almost completely to cyclopentadiene and only a small portion is polymerized to yield higher cyclopentadienes. These higher cyclopentadienes (about 0.2-0.3% of the dicyclopentadiene used) are removed from the still with the aid of a syphon together with the high-boiling by-products, and finally destroyed.

What is claimed is:

1. In a process for producing cyclopentadiene by vapor phase cracking of dicyclopentadiene the steps comprising:
    (a) preheating a feed stream consisting primarily of dicyclopentadiene and passing the preheated stream to a film evaporation zone;
    (b) partially evaporating the preheated stream in said film evaporation zone under mild temperature conditions below 240° C. and removing an overhead vapor comprising the major portion of the dicyclopentadiene in the feed stream together with a minor portion of cyclopentadiene and a liquid bottoms stream containing dicyclopentadiene together with other higher boiling components, and recycling a portion of said liquid bottoms stream to said film evaporator;
    (c) passing the said overhead vapor to a tubular cracking zone and cracking the dicyclopentadiene therein at a temperature of from 270 to 400° C. for 6 to 12 seconds under turbulent flow conditions;
    (d) cooling the cracked vapor stream and passing it to a fractionation zone including reinforcing and stripping sections and a heated sump, and fractionating the cracked stream into an overhead cyclopentadiene stream and a higher boiling bottoms fraction; and
    (e) passing the said liquid bottoms stream formed in step (b) to said sump and retaining it therein for 500 to 1000 hours to effect cracking of dicyclopentadiene contained therein to cyclopentadiene.

References Cited

UNITED STATES PATENTS

| 2,801,270 | 7/1957 | Nelson et al. | 260—666 A |
| 2,913,504 | 11/1959 | Hillard, Jr., et al. | 260—666 A |
| 2,994,724 | 8/1961 | Hillard, Jr., et al. | 260—666 A |
| 2,582,920 | 1/1952 | Businger et al. | 260—666 A |
| 2,867,670 | 1/1959 | McLean et al. | 260—666 A |
| 2,831,904 | 4/1958 | Kreps | 260—666 A |

DELBERT E. GANTZ, Primary Examiner

V. O'KEEFE, Assistant Examiner